US011787257B2

(12) United States Patent
Monroe

(10) Patent No.: US 11,787,257 B2
(45) Date of Patent: Oct. 17, 2023

(54) TORSION BUSHINGS AND RELATED ASSEMBLIES

(71) Applicant: Jerry A. Edwards, Portland, OR (US)

(72) Inventor: Ryan Monroe, Gresham, OR (US)

(73) Assignee: Jerry A. Edwards, Portland, OR (US)

( * ) Notice: Subject to any disclaimer, the term of this patent is extended or adjusted under 35 U.S.C. 154(b) by 0 days.

(21) Appl. No.: 17/826,887

(22) Filed: May 27, 2022

(65) Prior Publication Data
US 2022/0388365 A1    Dec. 8, 2022

Related U.S. Application Data

(60) Provisional application No. 63/208,049, filed on Jun. 8, 2021.

(51) Int. Cl.
B60G 21/055    (2006.01)
F16C 17/10    (2006.01)
F16C 33/10    (2006.01)

(52) U.S. Cl.
CPC ......... B60G 21/0551 (2013.01); F16C 17/10 (2013.01); F16C 33/1045 (2013.01); F16C 33/1065 (2013.01); B60G 2202/135 (2013.01); B60G 2204/41 (2013.01); B60G 2206/427 (2013.01); F16C 2326/05 (2013.01)

(58) Field of Classification Search
CPC .......... B60G 21/0551; B60G 2202/135; B60G 2204/41
See application file for complete search history.

(56) References Cited

U.S. PATENT DOCUMENTS

| | | | | |
|---|---|---|---|---|
| 8,882,092 B2 * | 11/2014 | Jang | ................. | B60G 21/0551 |
| | | | | 267/141 |
| 9,115,840 B2 * | 8/2015 | Sinadinos | .......... | B60H 1/00857 |
| 9,278,603 B2 * | 3/2016 | Yoshizawa | .......... | B60G 21/055 |
| 9,764,613 B2 | 9/2017 | Rowe et al. | | |
| 10,024,359 B2 | 7/2018 | Westnedge et al. | | |
| 10,124,646 B2 | 11/2018 | Higuchi et al. | | |

(Continued)

FOREIGN PATENT DOCUMENTS

| | | | | |
|---|---|---|---|---|
| CA | 2732392 A1 * | 8/2012 | ......... | B60G 21/0551 |
| CN | 101440853 B | 7/2010 | | |

(Continued)

OTHER PUBLICATIONS

CN 101440853 A machine translation from espacenet.com (Year: Dec. 2022).*

(Continued)

Primary Examiner — Paul N Dickson
Assistant Examiner — Maxwell L Meshaka
(74) Attorney, Agent, or Firm — Erise IP, P.A.

(57) ABSTRACT

A torsion bushing includes a body portion defining a torsion rod-receiving bore, one or more helical flexion ribs defining at least a portion of the torsion rod-receiving bore, and a helical lubrication reservoir adjacent to the one or more helical flexion ribs. The torsion bushing may be included in a torsion busing assembly that further includes a bracket. The bracket may have a saddle to receive the torsion bushing, and one or more flanges for coupling the bracket to a frame. The torsion bushing may be included in a torsion rod assembly that further includes the bracket and a torsion rod.

20 Claims, 3 Drawing Sheets

(56) References Cited

U.S. PATENT DOCUMENTS

Figure 1:
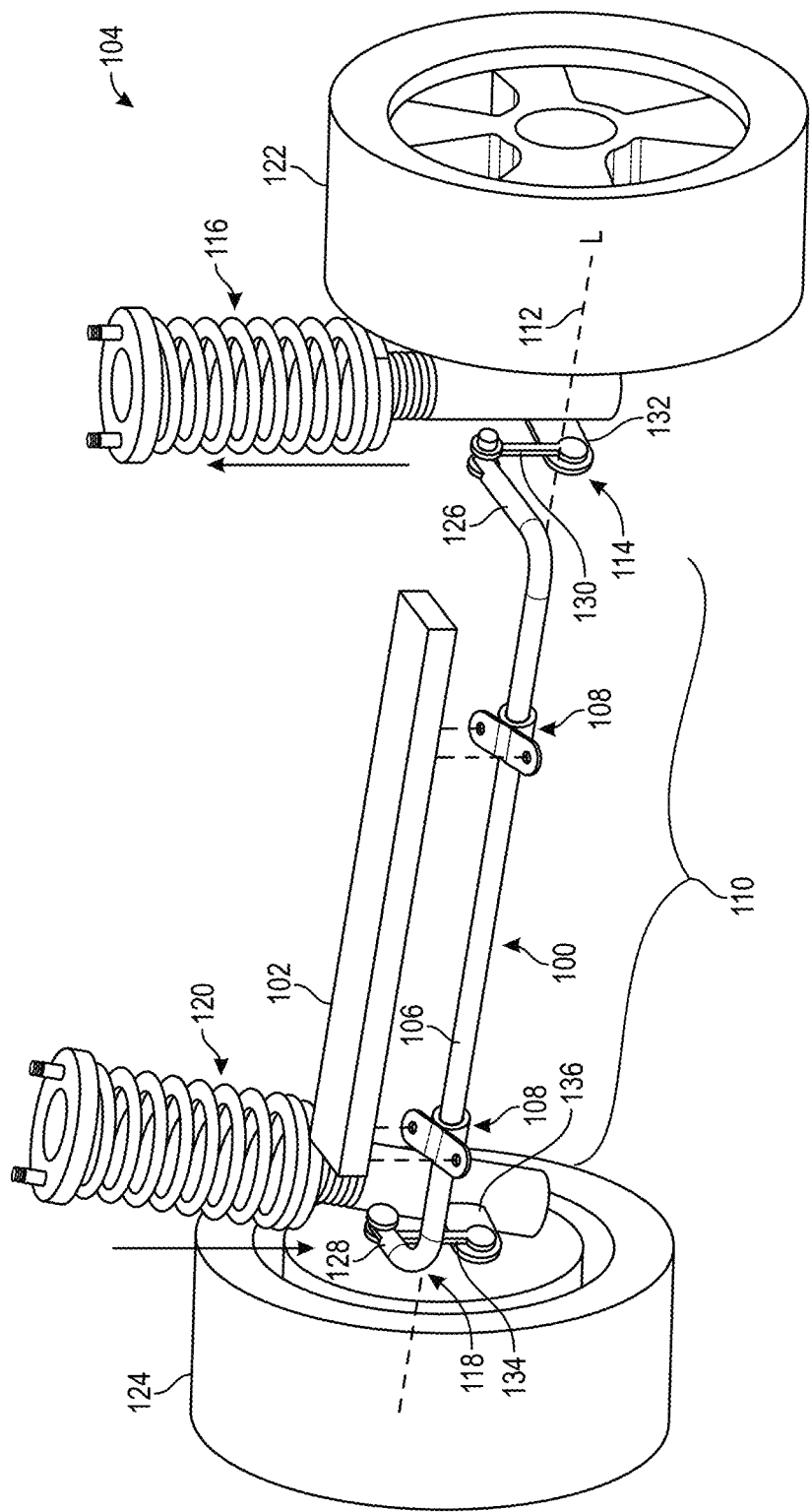

| | | | |
|---|---|---|---|
| 10,753,417 B2 | 8/2020 | Akiyama et al. | |
| 10,759,250 B2* | 9/2020 | Umeno | B60G 21/055 |
| 11,293,511 B2* | 4/2022 | Gehman | B60G 11/003 |
| 2004/0075235 A1* | 4/2004 | Cai | B60G 21/0551 |
| | | | 280/124.152 |
| 2012/0068429 A1* | 3/2012 | Hartel | B60G 21/0551 |
| | | | 156/242 |
| 2012/0211958 A1* | 8/2012 | Lam | B29C 45/14311 |
| | | | 425/500 |
| 2013/0028547 A1* | 1/2013 | Jang | B60G 21/0551 |
| | | | 384/215 |
| 2014/0001000 A1* | 1/2014 | Sinadinos | B60H 1/00857 |
| | | | 188/378 |
| 2015/0343876 A1* | 12/2015 | Yoshizawa | B60G 21/055 |
| | | | 403/230 |
| 2018/0272828 A1* | 9/2018 | Umeno | B60G 21/055 |
| 2021/0102592 A1* | 4/2021 | Gehman | B60G 7/001 |
| 2022/0186806 A1* | 6/2022 | Gehman | B60G 7/001 |

FOREIGN PATENT DOCUMENTS

| | | | | |
|---|---|---|---|---|
| CN | 104405808 A | | 3/2015 | |
| CN | 110203031 A | * | 9/2019 | ......... B60G 21/0551 |
| DE | 102019113484 A1 | * | 11/2020 | |
| FR | 2991236 A1 | * | 12/2013 | ............ B60G 11/60 |
| JP | 2007118872 A | | 5/2007 | |
| KR | 100862140 B1 | * | 10/2008 | |
| KR | 20110023274 A | * | 3/2011 | |
| KR | 20130008354 A | * | 1/2013 | |
| KR | 102104659 B1 | | 4/2020 | |
| KR | 20220028383 A | | 3/2022 | |
| WO | WO-2020049261 A1 | * | 3/2020 | ............ F16B 11/008 |

OTHER PUBLICATIONS

WO 2020049261 A1 machine translation from espacenet.com (Year: Dec. 2022).*

\* cited by examiner

TORSION BUSHINGS AND RELATED ASSEMBLIES

RELATED APPLICATION

This application claims priority to U.S. Provisional Application No. 63/208,049, filed Jun. 8, 2021, the contents of which are incorporated herein by reference in their entirety as if set forth verbatim.

FIELD

The present disclosure generally pertains to bushings and related assemblies, such as those utilized in association with automobile suspension systems, industrial equipment, and the like, including torsion rod assemblies and bushings associated therewith. The present disclosure additionally pertains to methods of supporting a torsion rod and methods of translating torque with a torsion rod.

BACKGROUND

A torsion rod may be used to translate torque, including torsion and/or rotation of the torsion rod, introduced by a force at one end of the torsion rod or the other. For example, a torsion rod may be utilized in association with an automotive suspension system to reduce axial rotation of a vehicle body during cornering, when traversing uneven terrain, when encountering crosswinds, and so forth. A torsion rod may also be utilized in association with various industrial equipment to translate torque, as well as in other contexts. The torsion rod may be supported by a support structure at one or more intermediate locations in a manner that allows the torsion rod to rotate about a longitudinal axis of the torsion rod responsive to torque. The support structure may allow the torsion rod to translate the torque, such as by torsion and/or by rotation, while resisting axial and lateral displacement of the torsion rod. The torque may translate from one end of the torsion rod to the other. For example, a lateral force at one end of the torsion rod may be translated as a lateral force at an opposite end of the torsion rod.

By way of example, in the context of an automotive suspension system, generally, a torsion rod may include a lever arm at opposite ends of the torsion rod that are respectively coupled to a suspension system for a left and right wheel of a vehicle. The suspension system for the left and right wheel may generally operate independently from one another while being partially coupled by the torsion rod. For example, a compression load upon the suspension system for the right wheel may impart a lateral force upon the right lever arm of the torsion rod, causing torsion and/or rotation of the torsion rod about a longitudinal axis of the torsion rod. The torsion and/or rotation of the torsion rod may translate to a lateral force upon the left lever arm that imparts a corresponding rebound load upon the suspension system for the left wheel. The torsion rod may similarly translate torque corresponding to a rebound load upon the suspension system for the right wheel. Likewise, the torsion rod may translate torque from the suspension system for the left wheel to the suspension system for the right wheel. A torsion rod may similarly translate torque from one end of the torsion rod to another in association with various industrial equipment, as well as in other contexts.

While the support structure used to support the torsion rod may resist axial and lateral displacement of the torsion rod, friction between the torsion rod and the support structure may interfere with rotation and/or torsion of the torsion rod about the longitudinal axis. Movement of the torsion rod relative to the support structure and/or friction associated with such movement may lead to wear and tear of the support structure, which, in turn, may lead to undesired axial and/or lateral displacement of the torsion rod. Additionally, or in the alternative, such movement and/or friction may cause noise and/or vibrations that are generally undesired. Such noise and/or vibration may be attributable to friction interfering with rotation and/or torsion of the torsion rod and/or to undesired axial or lateral displacement of the torsion rod, including displacement of the torsion rod associated with wear and tear of the support structure.

Accordingly, it would be welcomed to provide improved torsion rod assemblies and support structures, such as bushings and related assemblies, including for use in association with automobile suspension systems, industrial equipment, and the like. It would also be welcomed to provide improved methods of translating torque with a torsion rod.

SUMMARY

Aspects, features, and advantages of the presently disclosed subject matter are set forth in part in the following description. Further aspects and advantages may be apparent from the description or through practicing the presently disclosed subject matter.

In one aspect, the present disclosure provides torsion bushings. In one embodiment, a torsion bushing includes a body portion defining a torsion rod-receiving bore extending longitudinally through the body portion, one or more helical flexion ribs integral with the body portion and defining a portion of the torsion rod-receiving bore that includes a torsion rod-contacting surface, and a helical lubrication reservoir defined at least in part by the one or more helical flexion ribs.

In another aspect, the present disclosure provides torsion bushing assemblies. In one embodiment, a torsion bushing assembly includes a torsion bushing that has a body portion defining a bore and one or more helical flexion ribs extending along at least a portion of the bore, and a helical lubrication reservoir defined at least in part by the one or more helical flexion ribs. The torsion bushing assembly further includes a bracket that has a saddle and one or more flanges. The saddle receives the torsion bushing, and the one or more flanges are for coupling the bracket to a frame.

In yet another aspect, the present disclosure provides torsion rod assemblies. In one embodiment, a torsion rod assembly includes a torsion rod, a torsion bushing, and a bracket that has a saddle to receive the torsion bushing. The torsion bushing may have a body portion defining a torsion rod-receiving bore, one or more helical flexion ribs defining at least a portion of the torsion rod-receiving bore, and a helical lubrication reservoir adjacent to the one or more helical flexion ribs.

These and other aspects, features, and advantages thereof are further understood with reference to the following description, the accompanying drawing figures, and the appended claims. The foregoing summary is not intended to identify key features or essential features of the claimed subject matter, nor is it intended to limit the scope of the claimed subject matter.

BRIEF DESCRIPTION OF THE DRAWING FIGURES

Figure 2:
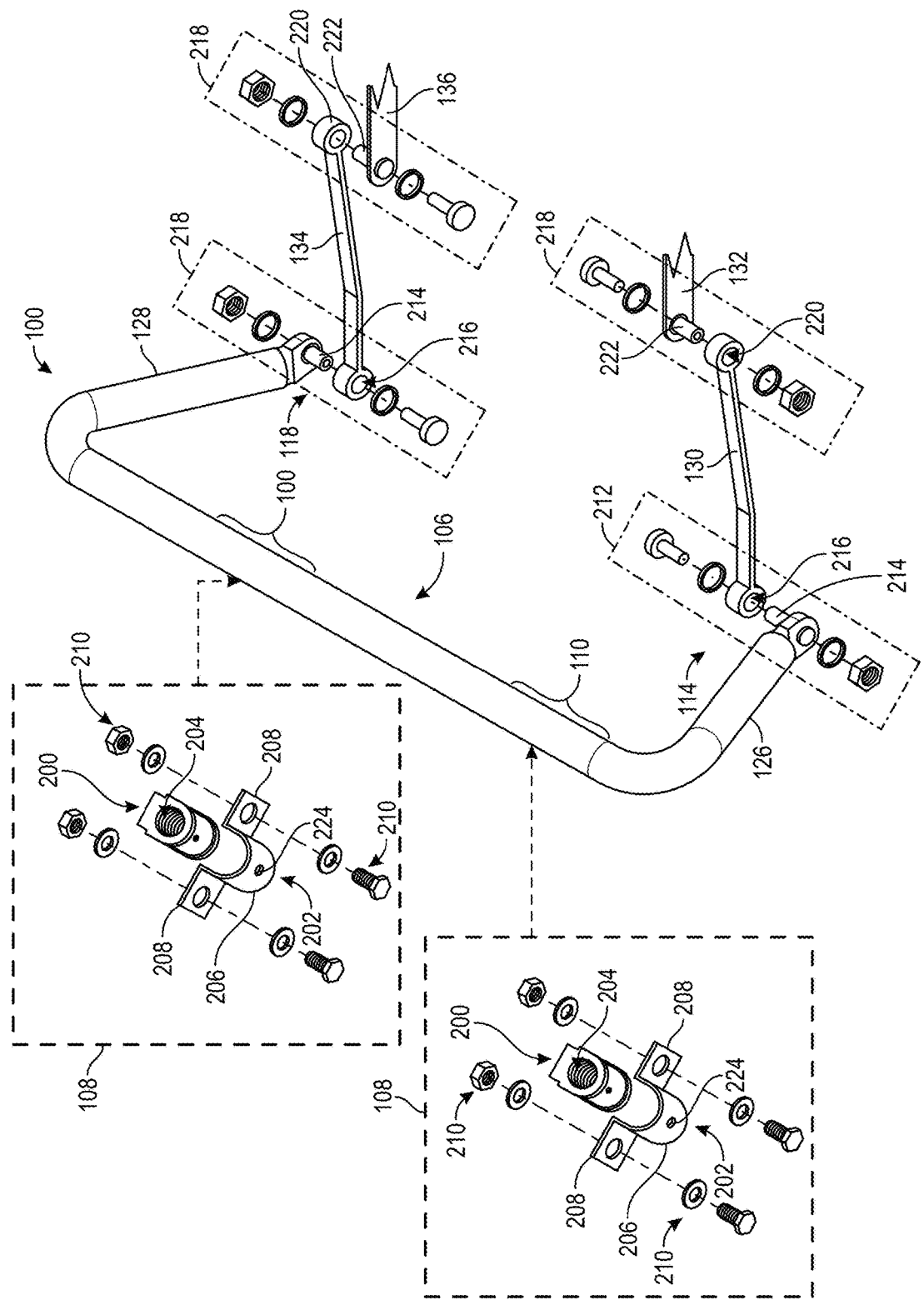
Figure 3A:
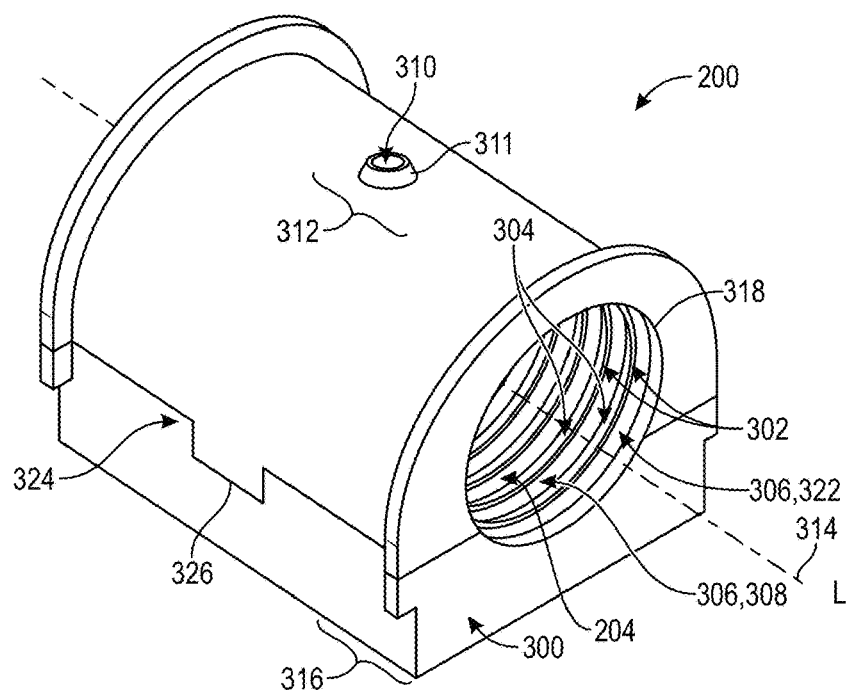
Figure 3B:
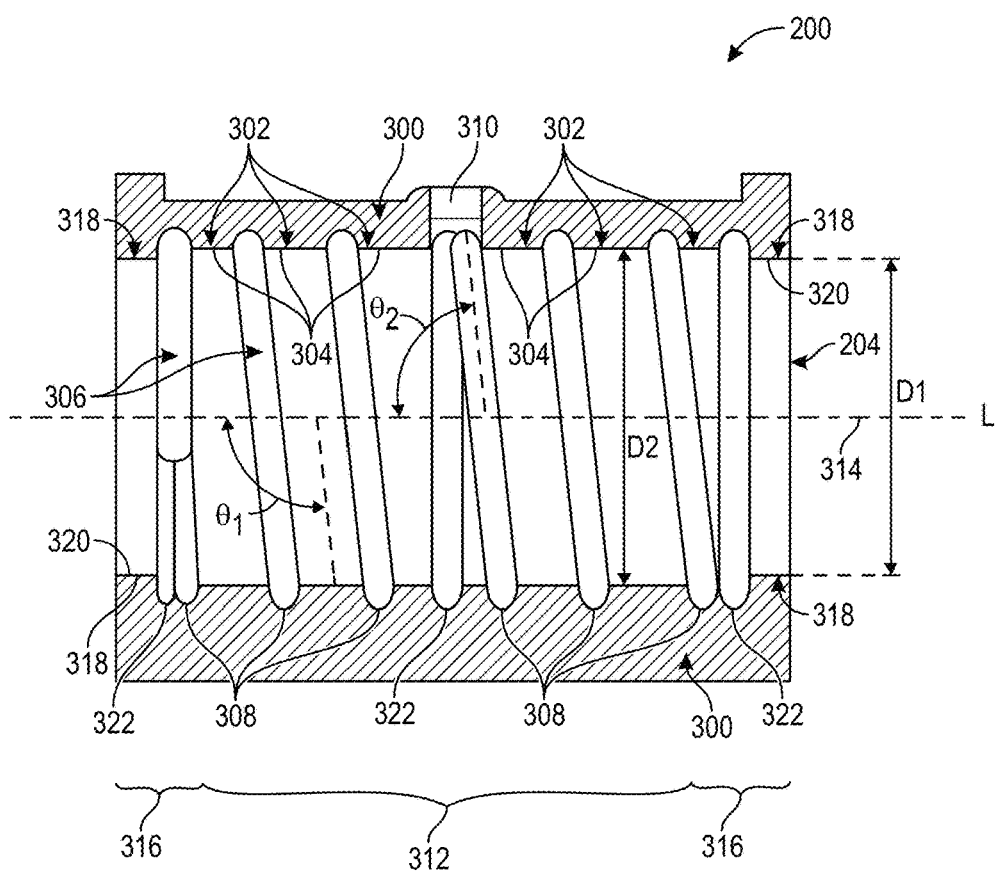

Embodiments of the invention are described in detail below with reference to the attached drawing figures, wherein:

FIG. 1 schematically depicts a perspective view of one embodiment of a torsion rod assembly;

FIG. 2 schematically depicts an exploded perspective view of one embodiment of a torsion rod assembly;

FIG. 3A schematically depicts a perspective view of one embodiment of a torsion bushing that may be included in a torsion rod assembly; and FIG. 3B schematically depicts a cross-sectional side view of the torsion bushing depicted in FIG. 3A.

The drawing figures illustrate example embodiments of the presently disclosed subject matter. The claims are not limited to the example embodiments depicted in the drawing figures. The aspects and features depicted in the drawing figures are not necessarily to scale. Repeat use of reference characters in the specification and drawing figures represent the same or analogous aspects or features.

DETAILED DESCRIPTION

The following detailed description references the accompanying drawing figures that illustrate example embodiments of the presently disclosed subject matter. The present disclosure, including the example embodiments depicted in the drawing figures, describe features, aspects, and advantages of the of the disclosed subject matter by way of explanation and not limitation. Various modifications, combinations, and variations can be made to the example embodiments or to aspects or features thereof without departing from the scope of the presently disclosed subject matter. Thus, the present disclosure encompasses such modifications, combinations, and variations. The present disclosure provides sufficient detail to enable those skilled in the art to practice the claimed invention. The present disclosure is, therefore, not to be taken in a limiting sense. The scope of the invention is defined only by the appended claims, along with the full scope of equivalents to which such claims are entitled.

The present disclosure provides torsion bushings and related assemblies, such as those utilized in association with automobile suspension systems, industrial equipment, and the like, including torsion bushing assemblies and torsion rod assemblies. The present disclosure additionally pertains to methods of supporting a torsion rod and methods of translating torque with a torsion rod. The presently disclosed torsion bushings include a bore extending longitudinally through the torsion bushing and one or more helical flexion ribs defining a portion of the bore. The one or more helical flexion ribs respectively have a torsion rod-contacting surface that provides an interference fit between the torsion bushing and a torsion rod fitted within the bore of the torsion bushing. The one or more helical flexion ribs allow the torsion bushing to exhibit localized torsion corresponding to torque translated by the torsion rod. The one or more helical flexion ribs themselves may exhibit localized torsion, and/or a body portion of the torsion bushing adjacent to a respective one or more helical flexion ribs may exhibit localized torsion that may be attributable and or enhanced at least in part by the one or more helical flexion ribs.

The localized torsion associated with the helical flexion ribs may allow for reduced rotational movement between the torsion bushing and the torsion rod fitted within the bore of the torsion bushing. Such reduced rotational movement provided by the presently disclosed torsion bushings may yield a decreased level of noise and/or vibration associated with movement and/or friction between a torsion rod and the support structure used to support the torsion rod. The localized torsion provided by the helical flexion ribs of the presently disclosed torsion rods may allow for a relatively tighter interference fit between the torsion rod and the bore of the torsion bushing, for example, in comparison to bushings that do not have helical flexion ribs. The relatively tighter interference fit may reduce axial and/or longitudinal displacement of the torsion rod with respect to the torsion bushing. Additionally, or in the alternative, the relatively tighter interference fit may facilitate localized torsion of the helical flexion ribs and/or the body portion of the torsion bushing adjacent to the helical flexion ribs.

The torsion rod-contacting surface between the helical flexion ribs and the torsion rod may provide a relatively uniform distribution of friction between the torsion rod and the torsion bushing, for example, relative to bushings that do not have a torsion rod-contacting surface. The relatively uniform distribution of friction provided by the torsion rod-contacting surface may further contribute to reduced noise and/or vibration. Additionally, or in the alternative, the relatively uniform distribution of friction provided by the torsion rod-contacting surface may provide a reduced tendency for a "stick and slip" effect between the torsion rod and the torsion bushing, for example, relative to bushings that do not have a torsion rod-contacting surface.

The one or more helical flexion ribs may define a corresponding one or more helical lubrication reservoirs. The helical lubrication reservoirs may supply lubrication to an interface between the torsion rod and the torsion rod-contacting surface of the one or more helical flexion ribs. The edges of the helical flexion ribs may provide reduced friction, reduced tendency for a "stick and slip" effect, and/or a corresponding reduction in noise and/or vibration, for example, relative to lubrication grooves oriented axially and/or circumferentially. Additionally, or in the alternative, the helical flexion ribs may reduce axial and/or longitudinal displacement, for example, relative to longitudinal interruptions in the contact surface, which, for example, may contribute to axial displacement, and/or relative to circumferential interruptions in the contact surface, which, for example, may contribute to longitudinal displacement.

As used herein, the term "torsion rod" refers to an elongate element, such as a rod, bar, shaft, pipe, or the like, that translates torque from one end to another, including rotation about a longitudinal axis of the torsion rod and/or torsion. By way of example, the term "torsion rod" may include and/or refer to a sway war, and anti-sway bar, a stabilizer bar, an anti-roll bar, or the like, such as those associated with suspension systems. Additionally, or in the alternative, a torsion rod may include and/or refer to an elongate element, such as a rod, bar, shaft, pipe, or the like, utilized as a weight-bearing spring, for example, in association with a suspension system, such as a torsion rod suspension system or a torsion spring suspension system.

The term "torque" refers to a moment of force that represents a capability of the force to produce a change in angular velocity and/or moment of inertia of an object. The term "moment" refers to the tendency of an applied force to rotate an object about an axis, but not necessarily to change the angular momentum object. Torque may cause an object to rotate about an axis and/or to undergo torsion. The term "torsion" refers to twisting of an object due to torque.

The term "interference fit" refers to refers to a fit between two mating parts, such as a rod and a bushing, in which the parts are held together at least in part by friction. An interference fit may include a first part, such as a rod, that has an outer perimeter, and a second part, such as a bushing, that has an inner perimeter, in which the outer perimeter of the first part is slightly larger than the inner perimeter of the first part, and the inner perimeter of the second part is fitted within the outer perimeter of the first part.

In this description, references to "one embodiment," "an embodiment," or "embodiments" mean that the feature or features being referred to are included in at least one embodiment of the presently disclosed subject matter. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the scope of the presently disclosed subject matter encompasses a variety of combinations and/or integrations of the example embodiments in this description.

The terms "a," "an," and "the" do not denote a limitation of quantity but rather denote the presence of at least one of the referenced item. The terms "first," "second," "third," and so forth may be used interchangeably to distinguish one item from another and are not intended to signify location or importance of the respective item. Range limitations in this description and in the claims include all endpoints, and all such endpoints are independently combinable to provide another range limitation.

The term "coupled," when used herein with reference to at least two objects, refers to direct or indirect mechanical or physical contact between two objects in which the two objects are linked, connected, fastened, or joined with one another, including by way of an interference fit, one or more fastening elements or hardware, by welding, or the like. The term "coupled" includes objects that are removably coupled with one another.

The term "integral" or "integrally formed," when used herein with reference to at least to elements, refers to two elements that respectively define a portion, part, or piece of one and the same object, and/or two objects that are permanently coupled to one another such that the objects cannot be separated from one another without destructive means. The term "integral" includes a portion, part, or piece of an element that cannot be separated from the whole of the element without destructive means. For example, the term "integral" may refer to objects that are welded together, objects that are formed or cast as a single unit, as well as portions, parts, or pieces of a single, monolithic object.

Referring now to FIG. 1, example embodiments of the present disclosure are further described. As shown in FIG. 1, a torsion rod assembly 100 may be coupled to a frame 102. The frame 102 may define a portion of a vehicle 104, such as an automobile, a train, an aircraft, or a marine vessel. In various embodiments, the vehicle 104, such as an automobile, may include a car, a truck, a recreational vehicle, an all-terrain vehicle, a race vehicle, an excavation vehicle, a mining vehicle, a construction vehicle, a warehouse vehicle, a trailer, a cart, or the like. The vehicle may be configured for personal, commercial, competition, or industrial use. The vehicle may be operated by a person and/or autonomously. The vehicle may be configured for operation in any desired context, including on roads, off-road, primitive terrain, on rails, on a track, indoors, and so forth. Additionally, or in the alternative, the frame 102 may define a portion of industrial equipment or machinery, such as a crane, an assembly-line, or the like.

As shown in FIG. 1, the torsion rod assembly 100 may include a torsion rod 106, and one or more torsion bushing assemblies 108. The one or more torsion bushing assemblies 108 may respectively couple the torsion rod 106 to the frame 102. In some embodiments, as shown in FIG. 1, a torsion bushing assembly 108 may be attached to the torsion rod 106 at an intermediate portion 110 along a longitudinal axis 112 of the torsion rod 106. Additionally, or in the alternative, a torsion bushing assembly 108 may be attached to an end portion of the torsion rod 106.

In some embodiments, one or more end portions of the torsion rod 106 may be coupled to a suspension system. For example, a first end portion 114 of the torsion rod 106 may be coupled to a first suspension system 116. Additionally, or in the alternative, a second end portion 118 of the torsion rod 106 may be coupled to a second suspension system 120. The first suspension system 116 may provide suspension to a first wheel 122 coupled thereto. The second suspension system 120 may provide suspension to a second wheel 124 coupled thereto. The torsion rod 106 may partially couple the first suspension system 116 and the second suspension system 120. Additionally, or in the alternative, the first end portion 114 of the torsion rod 106 may be coupled to the frame 102, or the second end portion 118 of the torsion rod 106 may be coupled to the frame 102. Movement of a respective suspension system, such as the first suspension system 116 or the second suspension system 120, may translate torque to the torsion rod 106. The torque translated to the torsion rod 106 may cause the torsion rod 106 to rotate about the longitudinal axis 112. Additionally, or in the alternative, the torsion rod 106 may undergo torsion as a result of the torque translated to the torsion rod 106.

In some embodiments, the torsion rod assembly 100 may include one or more lever arms that are oriented transverse to the longitudinal axis of the torsion rod 106. A respective lever arm may be integral or coupled to an end portion of the torsion rod 106. Additionally, or in the alternative, a respective lever arm may be integral or coupled to an intermediate portion 110 of the torsion rod 106. A respective lever arm may define a portion of the torsion rod 106. For example, as shown in FIG. 1, the torsion rod assembly 100 may include a first lever arm 126 integral to the intermediate portion 110 and the first end portion 114 of the torsion rod 106. The first lever arm 126 may define at least part of the first end portion 114 of the torsion rod 106. In some embodiments, as shown in FIG. 1, the torsion rod assembly 100 may include a second lever arm 128 integral to intermediate portion 110 and the second end portion 118 of the torsion rod 106. The second lever arm 128 may define at least part of the second end portion 118. In some embodiments, the first lever arm 126 and/or the second lever arm 128 may be formed by bending the torsion rod 106. Additionally, or in the alternative, the first lever arm 126 may be coupled to the first end portion 114 of the torsion rod 106 and/or the second lever arm 128 may be coupled to the second end portion 118 of the torsion rod 106.

In some embodiments, the torsion rod assembly 100 may include one or more end links. The torsion rod 106 and/or a respective lever arm may be coupled to a respective suspension system by a respective end link. For example, as shown in FIG. 1, the torsion rod assembly 100 may include a first end link 130 coupling the first lever arm 126 to the first suspension system 116, for example, at a first suspension arm 132 of the first suspension system 116. Additionally, or in the alternative, the torsion rod assembly 100 may include a second end link 134 coupling the second lever arm 128 to the second suspension system 120, for example, at a second suspension arm 136 of the second suspension system 120. Additionally, or in the alternative, the torsion rod 106 and/or the respective lever arm may be coupled directly to a respective suspension system, such as to a respective suspension arm thereof.

Referring now to FIG. 2, example torsion rod assemblies 100 and example torsion bushing assemblies 108 are further described. As shown in FIG. 2, a torsion rod assembly 100 may include a plurality of torsion bushing assemblies 108. A respective torsion bushing assembly 108 may include a torsion bushing 200 and a bracket 202. The torsion bushing 200 may define a bore 204 extending longitudinally through the torsion bushing 200. The bore 204 may sometimes be referred to as a torsion rod-receiving bore 204. The bore 204 (e.g., the torsion rod-receiving bore 204) may receive the torsion rod 106, such as an intermediate portion 110 of the torsion rod. The torsion rod-receiving bore 204 may be fitted around the intermediate portion 110 of the torsion rod 106. Additionally, or in the alternative, the torsion rod-receiving bore 204 may be slid or pressed onto the torsion rod 106, such as the intermediate portion 110 of the torsion rod 106.

The torsion rod-receiving bore 204 may provide an interference fit with respect to the torsion rod 106. The torsion rod-receiving bore 204 may include an inward perimeter that has geometry generally corresponding to an outward perimeter of the torsion rod 106, such an outward perimeter of the intermediate portion 110 of the torsion rod 106. For example, as shown in FIG. 2, the torsion rod 106, such as the intermediate portion 110 of the torsion rod 106, may have geometry that includes a cylindrical shape. The torsion rod-receiving bore 204 may have geometry that includes a cylindrical shape corresponding to the cylindrical shape of the torsion rod 106, for example, with dimensions that provide an interference fit with the torsion rod 106. Additionally, or in the alternative, the torsion rod 106, such as the intermediate portion 110 of the torsion rod 106, and the torsion rod-receiving bore 204 may respectively have geometry that includes an elliptical shape and/or a polyhedral shape, such as a prism shape.

The bracket 202 may include a saddle 206. The saddle 206 may receive the torsion bushing 200. The torsion bushing 200 may fit within the saddle 206 of the bracket 202. The saddle 206 and the torsion bushing 200 may have an interference fit with respect to one another. The interference fit may provide a compression load to the torsion bushing 200 when fitted in the saddle 206, for example, as between an outward perimeter of the torsion bushing 200 and an inward perimeter of the saddle 206. Additionally, or in the alternative, the interference fit between the torsion bushing 200 and the saddle 206 may provide a compression load to the torsion bushing 200 as between the torsion bushing 200 and the torsion rod 106, for example, as between the torsion rod-receiving bore 204 and the torsion rod 106, such as the intermediate portion 110 of the torsion rod.

The saddle 206 may surround at least a portion of the torsion bushing 200. When coupled to the frame 102 (FIG. 1), the saddle 206 may press the torsion bushing 200 against the frame 102. The saddle 206 may have an inward perimeter that includes geometry generally conforming to an outward perimeter of at least a portion of the torsion bushing 200. The torsion bushing 200 may have an outward perimeter that includes geometry generally conforming to an inward perimeter of the saddle 206. For example, as shown in FIG. 2, the outward perimeter of the torsion bushing 200 may have geometry that includes a truncated cylinder. Additionally, or in the alternative, the inward perimeter of the saddle 206 may have geometry that includes a truncated cylinder.

Such truncated cylinder may have a cross-sectional shape that generally corresponds to a semicircle cylinder shape that terminates on a flat edge, as shown, for example, having a shape of the capital letter "D." The outward perimeter of the torsion bushing 200 may additionally or alternatively include geometry that conforms to a surface of the frame 102 (FIG. 1). For example, such truncated cylinder geometry of the torsion bushing 200 may respectively correspond in part to the inward perimeter of the saddle 206 and in part to the surface of the frame 102. Additionally, or in the alternative, the outward perimeter of the torsion bushing 200 and/or the inward perimeter of the saddle 206 may respectively have geometry that includes an elliptical shape and/or a polyhedral shape, such as a prism shape. The surface of the frame 102 may include geometry corresponding to such outward perimeter of the torsion bushing 200, such as geometry corresponding to such an elliptical shape and/or such a polyhedral shape. Additionally, or in the alternative, a torsion bushing 200 may include any cylindrical, elliptical, and/or a polyhedral shape, that includes any number of flat or curved facets and/or edges, and/or any combination of facets, edges, terminations, and/or curvatures.

The bracket 202 may include one or more flanges 208 for coupling the bracket 202 to the frame 102 (FIG. 1), for example, with the torsion bushing 200 fitted within the saddle 206. The one or more flanges 208 may be located at opposite sides of the saddle 206. The saddle 206 may be disposed between a first flange 208 and a second flange 208. The bracket 202 may be coupled to the frame 102, for example, at the one or more flanges 208, with bracket coupling-hardware 210 such as one or more pins, bolts, nuts, and/or washers, or the like.

The interference fit between the saddle 206 and the torsion bushing 200, and/or the interference fit between the torsion bushing 200 and the torsion rod 106, may be provided at least in part by coupling the bracket 202 to the frame 102 with the torsion bushing 200 fitted within the saddle 206. The interference fit may provide a compression load to the torsion bushing 200 when fitted in the saddle 206, for example, as between an outward perimeter of the torsion bushing 200 and an inward perimeter of the saddle 206. Additionally, or in the alternative, the interference fit between the torsion bushing 200 and the saddle 206 may provide a compression load to the torsion bushing 200 as between the torsion bushing 200 and the torsion rod 106, for example, as between the torsion rod-receiving bore 204 and the torsion rod 106, such as the intermediate portion 110 of the torsion rod.

As further shown in FIG. 2, a torsion rod assembly 100 may include hardware, such as one or more linkage pins, one or more bushings, and/or one or more pins, bolts, nuts, washers, and so forth, for example, for coupling the end links to the torsion rod 106 and/or for coupling the end links to the frame 102. For example, the torsion rod assembly 100 may include a torsion rod-coupling assembly 212. The torsion rod-coupling assembly 212 may couple the torsion rod 106 to the first end link 130 and/or the second end link 134, respectively. The torsion rod-coupling assembly 212 may include one or more pins, bolts, nuts, and/or washers, or the like. Additionally, or in the alternative, the torsion rod-coupling assembly 212 may include one or more torsion rod-bushings 214. The torsion rod 106, such as the first end portion 114 and/or the second end portion 118 of the torsion rod 106, may include a torsion rod-coupling-receiving bore 216. Additionally, or in the alternative, the first end link 130 and/or the second end link 134 may include a torsion rod-coupling-receiving bore 216. The torsion rod-couplingreceiving bore 216 of the torsion rod 106 and/or the respective end link may respectively receive at least a portion of the torsion rod-coupling assembly 212. In some embodiments, the one or more torsion rod-bushings 214 may be configured in the same or substantially similar manner as a torsion bushing 200, for example, with an outward perimeter that has an interference fit with the torsion rod-coupling-receiving bore 216, and/or with a bore that includes an inward perimeter that has an interference fit with one or more elements of the torsion rod-coupling assembly 212, such as a pin or bolt.

The torsion rod assembly 100 may include end link-coupling assembly 218. The end link-coupling assembly 218 may couple the first end link 130 to the first suspension arm 132 and/or the second end link 134 to the second suspension arm 136, respectively. The end link-coupling assembly 218 may include one or more pins, bolts, nuts, and/or washers, or the like. Additionally, or in the alternative, the end link-coupling assembly 218 may include one or more end link-bushings 220. The first end link 130 and/or the second end link 134 may respectively include an end link-coupling-receiving bore 222. Additionally, or in the alternative, the first suspension arm 132 and/or the second suspension arm 136 may include an end link-coupling-receiving bore 222. The end link-coupling-receiving bore 222 of the first end link 130, the second link 134, the first suspension arm 132, and/or the second suspension arm 136 may respectively receive at least a portion of the end link-coupling assembly 218. In some embodiments, the one or more end link-bushings 220 may be configured in the same or substantially similar manner as a torsion bushing 200, for example, with an outward perimeter that has an interference fit with the end link-coupling-receiving bore 222, and/or with a bore that includes an inward perimeter that has an interference fit with one or more elements of the end link-coupling assembly 218, such as a pin or bolt.

In some embodiments, it may be desirable to attach the torsion bushing 200 to the to the torsion rod 106 and/or to the frame 102 or another member using another attachment method. For example, the bracket 202 may be welded or adhered to the frame 102 or to an attachment point. Additionally, or in the alternative, the torsion bushing 200 may be mounted directly to the frame 102 or to an attachment point. For example, a torsion bushing 200 may be welded, glued, or adhered, without the use of a bracket 202 or other separate attachment assembly. In further embodiments, a torsion bushing 200 may include threads that mate with corresponding threads on a bracket 202, a frame 102, or another attachment point.

Referring now to FIGS. 3A and 3B, example torsion bushings 200 are further described. As shown in FIGS. 3A and 3B, a torsion bushing 200 may include a body portion 300 and one or more helical flexion ribs 302. The one or more helical flexion ribs 302 may extend along at least a portion of the bore 204 of the torsion bushing 200. The body portion 300 and the helical flexion ribs 302 may be integral with one another. The body portion 300 and the helical flexion ribs 302 may be formed of the same material or respectively different materials. The one or more helical flexion ribs 302 may respectively define a portion of the bore 204 that includes a contact surface 304 that contacts the torsion rod 106, such as the intermediate portion 110 of the torsion rod 106, with the torsion bushing 200 fitted around the torsion rod 106 (FIGS. 1 and 2). The contact surface 304 may sometimes be referred to as a torsion rod-contacting surface 304. The torsion rod-contacting surface 304 may have an interference fit with the torsion rod 106, such as with the intermediate portion 110 of the torsion rod 106. The body portion 300 and/or the one or more helical flexion ribs 302 of the torsion bushing 200 may define one or more lubrication reservoirs 306. The one or more lubrication reservoirs 306 may include one or more helical lubrication reservoirs 308 defined at least in part by the one or more helical flexion ribs 302. The one or more helical lubrication reservoirs 308 may be further defined at least in part by the body portion 300 of the torsion bushing 200.

In some embodiments, the torsion bushing 200 may include one or more lubrication ports 310 providing fluid communication with the one or more lubrication reservoirs 306, such as the one or more helical lubrication reservoirs 308. The one or more lubrication ports 310 may be defined by the body portion 300 of the torsion bushing 200. As shown in FIGS. 3A and 3B, a lubrication port 310 may be located at a midward portion 312 of the torsion bushing 200 with respect to a longitudinal axis 314 of the bore 204 of the torsion bushing 200. In some embodiments, the lubrication port 310 may be disposed on a top portion or a bottom portion of the torsion bushing 200 (e.g., a portion opposite the frame 102 (FIG. 1). Additionally, or in the alternative, the one or more lubrication ports 310 may be located elsewhere about the torsion bushing 200, such as at an endward portion 316 of the torsion bushing 200 with respect to the longitudinal axis 314 of the bore 204. Referring again to FIG. 2, the bracket 202 may include an aperture 224 to coincide with and provide access to the lubrication port 310. As shown in FIGS. 3A and 3B, the lubrication port 310 may be at least partially surrounded by a lip 311 that fits within the aperture 224 (FIG. 2). In some embodiments, a torsion bushing 200 may not include lubrication port 310. In such embodiments, manual lubrication of the bore 204 of the torsion bushing 200 may be desirable. For example, lubrication may be applied within the bore 204 using a tool or by hand. Further, embodiments containing other methods of lubrication application are contemplated but are not described herein.

In some embodiments, the torsion bushing 200 may include one or more shaft seals 318. The one or more shaft seals 318 may be integral with the body portion 300 and/or with one or more helical flexion ribs 302. The one or more shaft seals 318 may be formed of a material that is the same or different from the material from which the body portion 300 and/or the helical flexion ribs 302 are formed. As shown in FIGS. 3A and 3B, the torsion bushing 200 may include a shaft seal 318 at respective endward portions 316 of the torsion bushing 200. A respective shaft seal 318 may define a sealing surface 320 that contacts the torsion rod 106, such as the intermediate portion 110 of the torsion rod 106, with the torsion bushing 200 fitted around the torsion rod 106 (FIGS. 1 and 2). The sealing surface 320 may have an interference fit with the torsion rod 106, such as with the intermediate portion 110 of the torsion rod 106. The sealing surface 320 may define a portion of the bore 204 of the torsion bushing 200.

The one or more shaft seals 318 may retain lubrication within the bore 204 of the torsion bushing 200, such as within the one or more lubrication reservoirs 306. Additionally, or in the alternative, the one or more shaft seals 318 may inhibit lubrication from leaking out of the bore 204 and/or the one or more lubrication reservoirs 306. Additionally, or in the alternative, the one or more shaft seals 318 may inhibit contaminants from entering the bore 204 and/or the one or more lubrication reservoirs 306. The one or more shaft seals 318 may be defined by body portion 300 of the torsion bushing 200. In some embodiments, the shaft seals 318 may facilitate preloading the interference fit between the torsion bushing 200 and the torsion rod 106.

In some embodiments, the one or more shaft seals 318 may define a reduced diameter opening of the bore 204 of the torsion bushing 200. The sealing surface 320 of the shaft seal 318 and/or a portion of the bore 204 coinciding with the shaft seal 318 may have a first inner diameter (D1), and the torsion rod-contacting surface 304 and/or a portion of the bore 204 coinciding with the torsion rod-contacting surface 304 may have a second inner diameter (D2). The first inner diameter (D1) may be smaller than the second inner diameter (D2). The one or more shaft seals 318 may have a relatively tighter interference fit with the torsion rod 106, such as the intermediate portion 110 of the torsion rod 106, relative to one or more other portions of the bore 204 of the torsion bushing 200, such as relative to the one or more torsion rod-contacting surfaces 304. Additionally, or in the alternative, in some embodiments, the one or more shaft seals 318 may define a portion of the bore 204 that includes an region that has an enlarged diameter relative to the diameter of the torsion rod-contacting surface 304 and/or the portion of the bore 204 coinciding with the torsion rod-contacting surface 304, and/or relative to the diameter of the sealing surface 320 of the shaft seal 318 and/or a portion of the bore 204 coinciding with the shaft seal 318. Additionally, or in the alternative, the one or more shaft seals 318 may define a portion of the bore 204 that has a tapered diameter and/or a diameter that is the same as the diameter of torsion rod-contacting surface 304 and/or the portion of the bore 204 coinciding with the torsion rod-contacting surface 304.

In some embodiments, the one or more lubrication reservoirs 306 may include one or more annular lubrication reservoirs 322. As shown in FIGS. 3A and 3B, the torsion bushing 200 may include an annular lubrication reservoir 322 disposed adjacent to a corresponding shaft seal 318. The annular lubrication reservoir 322 may be defined at least in part by an adjacent shaft seal 318. Additionally, or in the alternative, an annular lubrication reservoir 322 may be defined at least in part by the body portion 300 of the torsion bushing 200 and/or at least in part by one or more helical flexion ribs 302 of the torsion bushing 200. In some embodiments, as shown in FIGS. 3A and 3B, the torsion bushing 200 may include an annular lubrication reservoir 322 located at a midward portion 312 of the torsion bushing 200 with respect to the longitudinal axis 312 of the bore 204 of the torsion bushing 200. Such an annular lubrication reservoir 322 may have a location at the midward portion of the torsion bushing 200 that coincides with a location of the lubrication port 310. The one or more annular lubrication reservoirs 322 may fluidly communicate with the one or more helical lubrication reservoirs 308.

Referring still to FIGS. 3A and 3B, the one or more helical flexion ribs 302 may span a longitudinal length with respect to the longitudinal axis 314 of the bore 204 of the torsion bushing 200 that encompasses all or a portion of the length of the bore 204. For example, the one or more helical flexion ribs 302 may individually or collectively span from 60% to 100%, such as from 80% to 100%, or from 90% to 100%, of the length of the bore 204. In some embodiments, the torsion bushing 200 may include one or more helical flexion ribs 302 that span, individually or collectively, from a first annular lubrication reservoir 322 located adjacent to a first shaft seal 318 to a second annular lubrication reservoir 322 located adjacent to a second shaft seal 318. Additionally, or in the alternative, the torsion bushing 200 may include one or more helical flexion ribs 302 that span, individually or collectively, from the first annular lubrication reservoir 322 to a third annular lubrication reservoir 322 located at a midward portion 312 of the bore 204 corresponding to a location of a lubrication port 310. Additionally, or in the alternative, the torsion bushing 200 may include one or more helical flexion ribs 302 that span, individually or collectively, from the second annular lubrication reservoir 322 to the third annular lubrication reservoir 322 located at the midward portion 312 of the bore 204. In some embodiments, the torsion bushing 200 may include a first helical flexion rib 302 that spans at least a portion of the bore 204 between the first annular lubrication reservoir 322 and the third annular lubrication reservoir 322, and a second helical flexion rib 302 that spans at least a portion of the bore 204 between the second annular lubrication reservoir 322 and the third annular lubrication reservoir 322.

A respective helical flexion rib 302 may an arc length corresponding to one or more helical turns, or a fraction of a helical turn, about the longitudinal axis 314 of the bore 204. The term "helical turn" refers to one rotation about the longitudinal axis 314. One helical turn has an arc length of $2\pi$ radian. In some embodiments, a helical flexion rib 302 may include from ½ turn to 20 turns, such as from ½ turn to 1 turn, such as from 1 turn to 5 turns, such as from 5 turns to 10 turns, or such as from 10 turns to 20 turns. By way of example, the helical flexion ribs 302 shown in FIGS. 3A and 3B respectively have about 2.5 turns.

A respective helical lubrication reservoir 308 may an arc length corresponding to one or more helical turns, or a fraction of a helical turn, about the longitudinal axis 314 of the bore 204. The arc length of a helical lubrication reservoir 308 may be the same or different from an adjacent helical flexion rib 302. In some embodiments, a helical lubrication reservoir 308 may include from ½ turn to 20 turns, such as from ½ turn to 1 turn, such as from 1 turn to 5 turns, such as from 5 turns to 10 turns, or such as from 10 turns to 20 turns. By way of example, the helical lubrication reservoir 308 shown in FIGS. 3A and 3B respectively have about 2.5 turns.

An annular lubrication reservoir 322 may have an arc length of up to $2\pi$ radian. An annular lubrication reservoir 322 that has an arc length of less than $2\pi$ radian may sometimes be referred to as a semiannular lubrication reservoir 322. By way of example, an annular or semiannular lubrication reservoir 322 may have an arc length of from $\pi/6$ radian to $2\pi$ radian, such as from $\pi/6$ radian to $\pi/2$ radian, such as from $\pi/2$ radian to $\pi$ radian, or such as from $\pi$ radian to $2\pi$ radian.

A respective helical flexion rib 302 may have a rib-pitch angle ($\theta 1$) determined with reference to the longitudinal axis 314. The rib-pitch angle ($\theta 1$) may be from 1 to 89 degrees, such as from 1 to 45 degrees, such as from 30 to 60 degrees, such as from 47 to 75 degrees, such as 60 to 89 degrees, or such as from 65 to 85 degrees. A rib-pitch angle ($\theta 1$) may be determined with respect to a helical centerline of the respective helical flexion rib 302. In some embodiments, a helical flexion rib 302 may include a first rib-pitch angle ($\theta 1$) coinciding with a first longitudinal position with respect to the longitudinal axis 314 of the bore 204 and a second rib-pitch angle ($\theta 1$) coinciding with a second longitudinal position with respect to the longitudinal axis 314 of the bore 204, in which the first rib-pitch angle ($\theta 1$) and the second rib-pitch angle ($\theta 1$) are different from one another. For example, the first rib-pitch angle ($\theta 1$) and the second rib-pitch angle ($\theta 1$) may differ from one another by at least 5 degrees. Additionally, or in the alternative, a helical flexion rib 302 may include a third rib-pitch angle ($\theta 1$) coinciding with a first circumferential position with respect to a circumference of the bore 204 and a fourth rib-pitch angle (θ1) coinciding with a second circumferential position with respect to the circumference of the bore 204, in which the third rib-pitch angle (θ1) and the fourth pitch rib-pitch angle (θ1) are different from one another. For example, the third rib-pitch angle (θ1) and the fourth rib-pitch angle (θ1) may differ from one another by at least 5 degrees.

A respective helical lubrication reservoir 308 may have a reservoir-pitch angle (θ2) generally corresponding to the aforementioned rib-pitch angles (θ1), including the aforementioned ranges thereof. A reservoir-pitch angle (θ2) may be determined with respect to a helical centerline of the respective helical lubrication reservoir 308. An annular lubrication reservoir 322 may have a reservoir-pitch angle (θ2) of 90 degrees.

In some embodiments, a torsion busing 200 may include various alternative configurations of the one or more helical flexion ribs 302 and/or or the one or more helical lubrication reservoirs 308. For example, a torsion busing 200 may include one or more helical flexion ribs 302 terminated or separated by one or more one or more helical lubrication reservoirs 308 and/or by one or more annular lubrication reservoir 322, at either or both ends of the respective helical flexion rib 302. Additionally, or in the alternative, the spacing between respective helical flexion ribs 302 and/or between respective helical lubrication reservoirs 308 may be varied, for example, to realize one or more aspects and advantages of the presently disclosed torsion bushings 200 in varying degrees. Additionally, or in the alternative, the helical flexion ribs 302 may have varying height, and/or the helical lubrication reservoirs 308 may have varying depth, for example, to realize one or more aspects and advantages of the presently disclosed torsion bushings 200 in varying degrees.

The torsion bushing 200 may be composed of one or more materials. In some embodiments, the one or more materials may include an elastomeric material, such as a polyurethane material, or other plastic, rubber, or polymeric materials. Additionally, or in the alternative, the torsion bushing 200 may be composed of one or more metals or metal alloys, alone or in combination with one or more elastomeric materials. In some embodiments, a torsion bushing 200 may include an outer shell composed of a material that includes a rigid plastic material and an inner section that includes an elastomeric material, such as a polyurethane material, or other plastic, rubber, or polymeric material. For example, the body portion 300 of the torsion bushing 200 may be composed of a material that includes a rigid plastic material. Additionally, or in the alternative, the helical flexion ribs 302 may be formed of an elastomeric material, such as a polyurethane material, or other plastic, rubber, or polymeric material. The shaft seals 318 may be formed of a material that includes a rigid plastic material and/or that includes an elastomeric material, such as a polyurethane material, or other plastic, rubber, or polymeric material.

In some embodiments, the torsion bushing 200 may include a material that has a hardness of from 20 Shore A to 90 Shore A, such as from 30 Shore A to 80 Shore A, such as from 30 Shore A to 50 Shore A, such as from 50 Shore A to 80 Shore A, such as from 50 Shore A to 90 Shore A, or such as from 80 Sore A to 90 Shore A. The material of the body portion 300, the helical flexion ribs 302, and/or the shaft seals 318 may be respectively selected from the aforementioned ranges. In some embodiments, the body portion 300 of the torsion bushing 200 may have a first hardness that differs from a second hardness of the one or more helical flexion ribs 302 and/or of the one or more shaft seals 318 by from 10 to 70 Shore A, such as from 10 to 20 Shore A, such as from 20 to 30 Shore A, such as from 30 to 50 Shore A, or such as from 50 to 70 Sore A. Additionally, or in the alternative, the one or more helical flexion ribs 302 may have a first hardness that differs from a second hardness of the one or more shaft seals 318 by from 10 to 70 Shore A, such as from 10 to 20 Shore A, such as from 20 to 30 Shore A, such as from 30 to 50 Shore A, or such as from 50 to 70 Sore A.

A torsion bushing 200 may be coupled to a torsion rod 106 by sliding the torsion busing 200 over the torsion rod 106 so that the torsion rod becomes seated in the bore 204 of the torsion bushing 200. Additionally, or in the alternative, the torsion rod 106 may be slid into the bore 204 of the torsion bushing 200. In some embodiments, as shown, for example, in FIG. 3A, a torsion bushing 200 may include a slit 324 extending longitudinally along the torsion bushing 200. The torsion rod 106 may be fitted into the bore 204 by way of the slit 324. The slit 324 may allow the torsion bushing 200 to be expanded to receive the torsion rod 106 into the bore 204. The slit 324 may include one or more teeth 326. The teeth 326 may provide resistance to displacement of the torsion bushing 200 associated with the slit 324, such as lateral and/or axial displacement.

In some embodiments, the presently disclosed torsion rod assemblies 100, torsion bushing assemblies 108, and/or torsion bushings 200 may be implemented in the context of an automotive sway bar. Some automotive sway bars may produce loud noises when the sway bar flexes within a bushing or other structure used to support the sway bar. Some bushing may include grease grooves cut into a bore that receives the sway bar to provide lubrication to the interface between the sway bar and the bushing. Commonly, these grease grooves may be oriented either longitudinally along the bushing length or circumferentially, in a circular pattern around the bushing bore. Grease grooves that run longitudinally along the bushing length tend to act as a grip on the sway bar, producing a "grip and slip" effect, that may result in loud popping noises when the sway bar flexes during regular use. Circumferential grooves that are perpendicular to the bushing length may reduce the noise associated with longitudinal grooves reducing noise, yet such circumferential grooves tend to provide insufficient lubrication, leading to wear and tear and a reduced useful live of the bushing and/or related components.

The presently disclosed torsion bushings advantageously provide reduced noise and reduced "grip and slip" effect, while also providing good distribution of lubrication. Some embodiments the present disclosure are directed to a greaseable automotive sway bar bushing device for reducing friction and noise within an automotive sway bar. Some of the disclosed embodiments are directed to an automotive sway bar system for reducing friction and noise, the system comprising an automotive sway bar and a bushing coupled to the automotive sway bar. Additionally, or in the alternative, the presently disclosed torsion bushings 200, torsion bushing assemblies 108, and/or torsion rod assemblies 100, may be used or implemented in connection with a shock mount, or in other vehicle attachments. Some embodiments of the present disclosure are directed to other implementations or uses of the presently disclosed torsion bushings 200, torsion bushing assemblies 108, and/or torsion rod assemblies 100, including industrial equipment and the like. Such industrial equipment may include, for example, equipment used in association with oil well drilling, such as an assembly connecting a kelly to a rotary table. Further, embodiments are contemplated where the presently disclosed torsion bushings 200, torsion bushing assemblies 108, and/or torsion rod assemblies 100 facilitate axial movement of a member disposed within the bore 204 of the torsion bushing 200 and includes other types of noise and vibration reduction that are not described herein. Regardless of the particular use or implementation, the aspects and advantages of the presently disclosed torsion bushings 200, torsion bushing assemblies 108, and/or torsion rod assemblies 100, may be realized by practicing the presently disclosed subject matter.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A torsion bushing for an automotive sway bar assembly, the torsion bushing comprising:
   a body portion defining a torsion rod-receiving bore extending longitudinally through the body portion;
   one or more helical flexion ribs integral with the body portion and defining a portion of the torsion rod-receiving bore comprising a torsion rod-contacting surface; and
   a helical lubrication reservoir defined at least in part by the one or more helical flexion ribs, the helical lubrication reservoir comprising:
      one or more spiral lubrication channels disposed along a length of the torsion bushing; and
      a plurality of circumferential lubrication channels oriented perpendicular to the length of the torsion bushing and fluidly connected to the one or more spiral lubrication channels, the plurality of circumferential lubrication channels comprising:
         a first circumferential lubrication channel disposed at a first end of the torsion bushing;
         a second circumferential lubrication channel disposed at a second end of the torsion bushing, the second end of the torsion bushing distinct from the first end of the torsion bushing; and
         a third circumferential lubrication channel disposed at a central portion of the torsion bushing.

2. The torsion bushing of claim 1, comprising:
   a lubrication port defined at least in part by the body portion, the lubrication port in fluid communication with the helical lubrication reservoir.

3. The torsion bushing of claim 1, comprising:
   a shaft seal integral with the body portion, the shaft seal located at an end portion of the torsion bushing.

4. The torsion bushing of claim 3, comprising:
   an annular lubrication reservoir defined at least in part by the shaft seal.

5. The torsion bushing of claim 4, wherein the helical lubrication reservoir and the annular lubrication reservoir are in fluid communication.

6. The torsion bushing of claim 5, comprising:
   an additional annular lubrication reservoir in fluid communication with the helical lubrication reservoir, the additional annular lubrication reservoir located at a midward portion of the torsion bushing.

7. The torsion bushing of claim 1, wherein the one or more helical flexion ribs have a pitch angle of from 65 to 85 degrees.

8. The torsion bushing of claim 7, wherein the one or more helical flexion ribs respectively comprise an arc length of from 1 to 5 turns.

9. The torsion bushing of claim 1, wherein the torsion bushing comprises a rubber material, a plastic material, or a polyurethane material.

10. The torsion bushing of claim 9, wherein the body portion comprises a first material and the one or more helical flexion ribs comprise a second material, wherein the first material is different from the second material.

11. The torsion bushing of claim 9, wherein the body portion has a first hardness and the one or more helical flexion ribs have a second hardness, wherein the first hardness and the second hardness differ by from 10 to 70 Shore A.

12. The torsion bushing of claim 9, wherein the body portion has a hardness of from 50 to 90 Shore A, wherein the one or more helical flexion ribs have a hardness of from 20 to 50 Shore A.

13. The torsion bushing of claim 9, comprising:
   a shaft seal integral with the body portion, wherein the body portion has a first hardness and the shaft seal has a second hardness, wherein the first hardness and the second hardness differ by from 10 to 70 Shore A.

14. A torsion bushing assembly, comprising:
   a torsion bushing comprising a body portion defining a bore and one or more helical flexion ribs extending along at least a portion of the bore, and a helical lubrication reservoir defined at least in part by the one or more helical flexion ribs, the helical lubrication reservoir comprising:
      one or more spiral lubrication channels disposed along a length of the torsion bushing; and
      a plurality of circumferential lubrication channels oriented perpendicular to the length of the torsion bushing and fluidly connected to the one or more spiral lubrication channels, the plurality of circumferential lubrication channels comprising:
         a first circumferential lubrication channel disposed at a first end of the torsion bushing;
         a second circumferential lubrication channel disposed at a second end of the torsion bushing, the second end of the torsion bushing distinct from the first end of the torsion bushing; and
         a third circumferential lubrication channel disposed at a central portion of the torsion bushing; and
   a bracket, the bracket comprising a saddle and one or more flanges, the saddle configured to receive the torsion bushing, and the one or more flanges for coupling the bracket to a frame.

15. The torsion bushing assembly of claim 14, wherein the saddle provides a compression load to the torsion bushing when fitted in the saddle.

16. The torsion bushing assembly of claim 14, wherein an outward perimeter of the torsion bushing has a geometry that comprises a truncated cylinder.

17. A torsion rod assembly, the torsion rod assembly comprising:
   a torsion rod;
   a torsion bushing comprising a body portion defining a torsion rod-receiving bore, one or more helical flexion ribs defining at least a portion of the torsion rod-receiving bore, and a helical lubrication reservoir adjacent to the one or more helical flexion ribs, the helical lubrication reservoir comprising:
      one or more spiral lubrication channels disposed along a length of the torsion bushing; and
      a plurality of circumferential lubrication channels oriented perpendicular to the length of the torsion bushing and fluidly connected to the one or more spiral lubrication channels, the plurality of circumferential lubrication channels comprising:
a first circumferential lubrication channel disposed at a first end of the torsion bushing;
a second circumferential lubrication channel disposed at a second end of the torsion bushing, the second end of the torsion bushing distinct from the first end of the torsion bushing; and
a third circumferential lubrication channel disposed at a central portion of the torsion bushing; and
a bracket comprising a saddle configured to receive the torsion bushing.

18. The torsion rod assembly of claim 17, wherein the torsion bushing and the saddle have an interference fit, the interference fit providing a compression load between the torsion bushing and the torsion rod when fitted within the torsion rod-receiving bore.

19. The torsion rod assembly of claim 17, wherein the torsion rod comprises an intermediate portion and a lever arm integral to the intermediate portion.

20. The torsion rod assembly of claim 19, comprising:
an end link; and
a torsion rod-coupling assembly configured to couple the torsion rod to the end link, the torsion rod-coupling assembly comprising a torsion rod-bushing, the torsion rod-bushing comprising a body portion defining a bore and one or more helical flexion ribs extending along at least a portion of the bore.

\* \* \* \* \*